US007308340B2

(12) United States Patent
Matsuoka et al.

(10) Patent No.: US 7,308,340 B2
(45) Date of Patent: Dec. 11, 2007

(54) INFORMATION PROCESSING APPARATUS AND COOLING METHOD

(75) Inventors: Heiwa Matsuoka, Tokyo (JP); Shinichi Furuta, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 11/208,286

(22) Filed: Aug. 19, 2005

(65) Prior Publication Data

US 2006/0085145 A1    Apr. 20, 2006

(30) Foreign Application Priority Data

Oct. 1, 2004    (JP)    ............... P2004-290589

(51) Int. Cl.
  *G06F 19/00*    (2006.01)
(52) U.S. Cl. .............. 700/300; 702/57; 713/300; 361/687
(58) Field of Classification Search ........... 700/299, 700/300; 702/57; 713/300, 320, 323; 361/687
See application file for complete search history.

(56) References Cited

U.S. PATENT DOCUMENTS 5,777,897 A * 7/1998 Giorgio ............... 700/299
6,859,882 B2 * 2/2005 Fung ................... 713/300

FOREIGN PATENT DOCUMENTS

JP    09/198166    7/1997

* cited by examiner

*Primary Examiner*—Kidest Bahta
*Assistant Examiner*—Douglas S Lee
(74) *Attorney, Agent, or Firm*—Blakely, Sokoloff, Taylor & Zafman LLP

(57) ABSTRACT

According to one embodiment, an information processing apparatus comprises a memory to store a first operating system used in a first mode and a second operating system used in a second mode, where the first operating system supports a greater number of functions than the second operating system. The information processing apparatus further comprises a processor to execute the first operating system and the second operating system, a cooling unit, and a driving unit to drive the cooling unit in accordance with the operating load in the first mode, and to drive the cooling unit in a predetermined level regardless of the operating load in the second mode.

20 Claims, 4 Drawing Sheets

| | TV tuner | HDD | CD/DVD | First fan | Second fan |
|---|---|---|---|---|---|
| TV viewing | ○ | | | 4000 | 3000 |
| TV image recording | ○ | ○ | | 4500 | 3500 |
| DVD viewing | | | ○ | 3500 | Off |
| CD appreciation | | | ○ | 3000 | Off |

INFORMATION PROCESSING APPARATUS AND COOLING METHOD

CROSS-REFERENCE TO RELATED APPLICATIONS

This application is based upon and claims the benefit of priority from Japanese Patent Application No. 2004-290589, filed Oct. 1, 2004, the entire contents of which are incorporated herein by reference.

BACKGROUND

1. Field

One embodiment of the invention relates to an information processing apparatus and a cooling method for an information processing apparatus.

2. Description of the Related Art

In recent years, personal computers have been implemented with a cooling unit that operates to cool the environment inside the computer housing, responding to a temperature rise inside the computer housing. In addition, the cooling unit may perform cooling operations based on an indirect measured value, such as whether or not the computer is powered by a commercial alternating power source or powered by a battery or a direct temperature measurement represented by a temperature indication number. An example of such a personal computer is disclosed in Japanese Patent Application Publication (KOKAI) No. 9-198166.

A temperature management method described in this reference determines a desired state of at least one cooling option such as a fan on the basis of a detected temperature and an indirect input. For example, a fan speed is set to any of 0%, 50%, 75%, and 100%.

Moreover, personal computers have been implemented with audio visual (also referred as "AV") functionality. As an example, personal computers may include a TV tuner is incorporated to view a TV program and an MPEG-2 encoder, a hard disk drive (also referred as "HDD"), or a digital versatile disk (also referred as "DVD") drive is incorporated to compress, encode, and record the TV program in accordance with the MPEG-2 system.

In such an AV viewing environment, the computer is used as an AV device instead of as a personal computer, and thus, a lower noise output by the computer would be preferable. Since it is possible to execute an application in a multi-task manner in a general personal computer use environment, a cooling capability is fulfilled so as to achieve its function even at the time of a maximum load.

Therefore, it is necessary to increase a cooling capability according to an operating load of a system, and the number of rotations of a fan is controlled in a multi-stepped manner. Since the control system is also applied to the AV viewing environment as is, a user recognizes that the number of rotations of the fan changes during viewing of an AV program, and it is expected that the user feels the change to be noisy. Further, if the number of rotations of the fan increases, it leads to noise generation.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

DETAILED DESCRIPTION

Various embodiments according to the present invention will be described hereinafter with reference to the accompanying drawings. In general, according to one embodiment of the invention, an information processing apparatus comprises a memory to store a first software (e.g., operating system, application program, etc.) used in a first mode and a second software (e.g., operating system, application program, etc.) used in a second mode. As an example, the first operating system supports a wider range of functionality, namely a greater number of functions including those unrelated to AV functions, than the second operating system. The information processing apparatus further comprises a processor to execute the first operating system and the second operating system, a cooling unit, and a driving unit to drive the cooling unit in accordance with the operating load in the first mode, and to drive the cooling unit in a predetermined level regardless of the operating load in the second mode.

An embodiment of an information processing apparatus according to the present invention will be described below in detail referring to the accompanying drawings.

Figure 1:
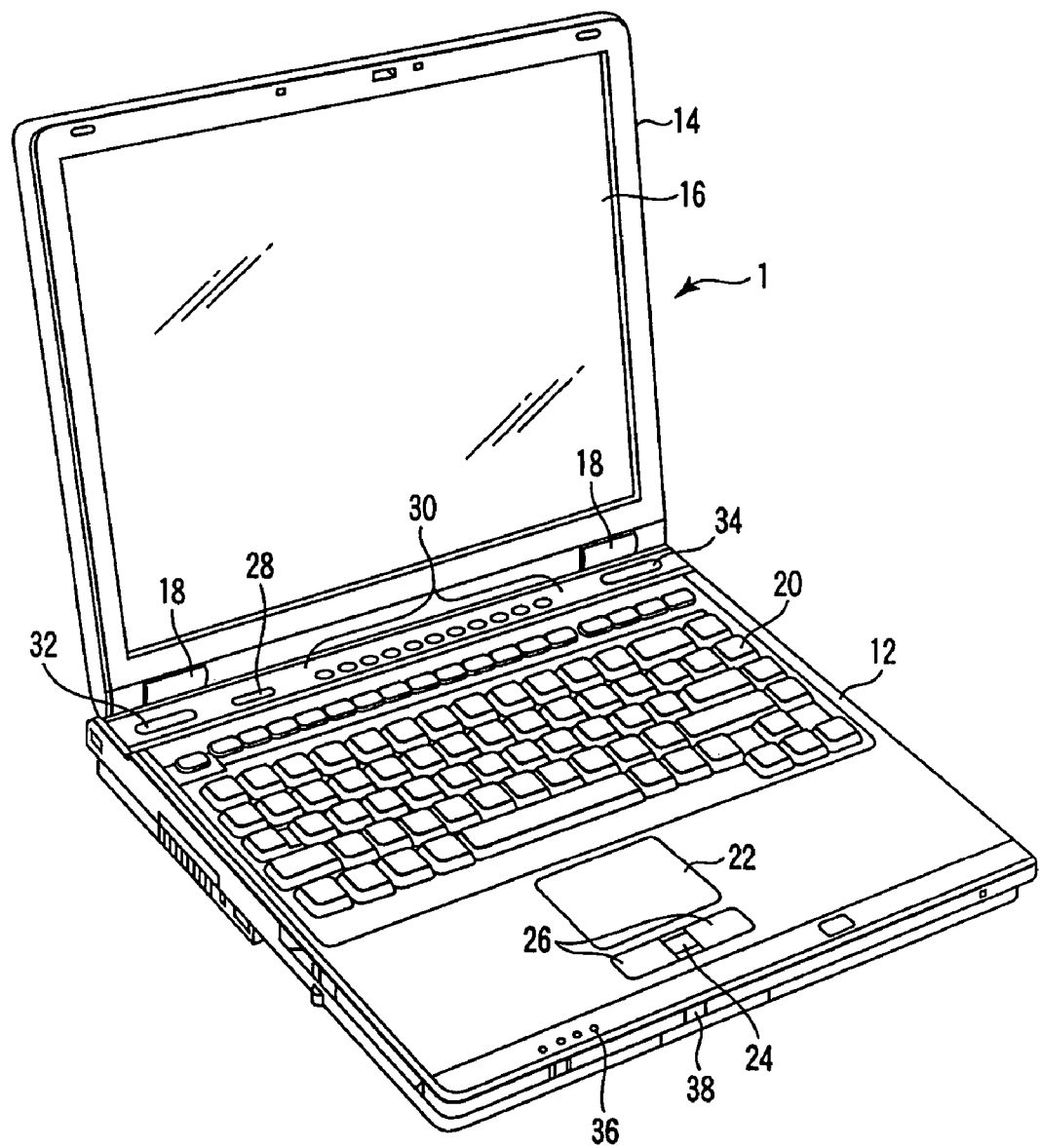
FIG. 1 is an exemplary perspective view showing a personal computer that is an information processing apparatus according to one embodiment of the present invention.

FIG. 1 shows a personal computer 1 that is an information processing apparatus according to one embodiment.

The personal computer 1 comprises a computer main body 12 and a display unit 14. The display unit 14 incorporates a display panel 16 configured by an LCD. The display unit 14 is mounted to the computer main body 12 via a hinge 18 so as to be rotationally changed between an open position and a closed position. FIG. 1 shows a state in which the display unit 14 of the personal computer 1 is open. The computer main body 12 has a thin box-shaped housing 19, and a keyboard 20 is provided at a center part of an upper face of the housing.

An armrest 21 is formed on an upper face of the housing 19 in front side of the keyboard 20. A touch pad 22, a scroll button 24, and a touch control button 26 are provided at a substantial center part of the armrest 21. A power button 28 for turning on/off the power supply of the personal computer 1 and ten AV buttons 30 and left and right speakers 32 and 34 are disposed between the hinges 18 and the keyboard 20, that is, at the back side of the keyboard 20. A variety of indicators 36 which comprises LEDs, are indicative of a power supply state or an HDD operating state. A remote controller receiving section 38 are provided on a frontal face of the housing 19.

Figures 2, 5:
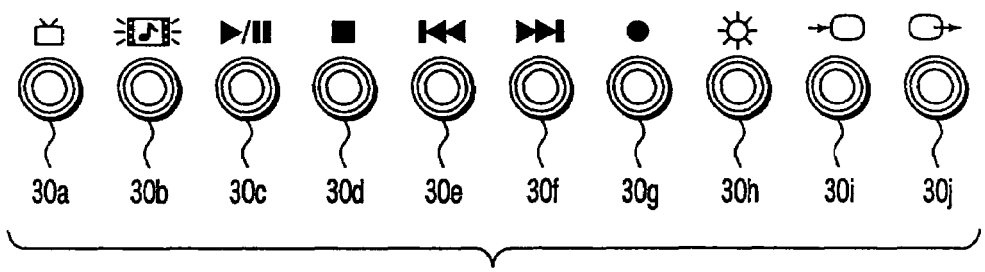
FIG. 2 is an exemplary plan view showing AV buttons according to the embodiment.
FIG. 5 is a table showing an exemplary number of rotations of a fan for each application at the time of an AV specific OS operation according to the embodiment.

FIG. 2 is a detailed view showing the ten AV buttons 30. In order from the left, a TV button 30a, a CD/DVD button 30b, a play/pause button 30c, a stop button 30d, a backward button 30e, a forward button 30f, a record button 30g, a luminance button 30*h*, a monitor input button 30*i*, and a TV output button 30*j* are provided.

The TV button 30*a* is the button pressed to activate or deactivate a TV viewing application in order to watch TV while WINDOWS® OS software is activated.

The CD/DVD button 30*b* is the button that executes an AV viewing application for viewing CD or DVD while the WINDOWS® OS software is activated.

Figure 3:
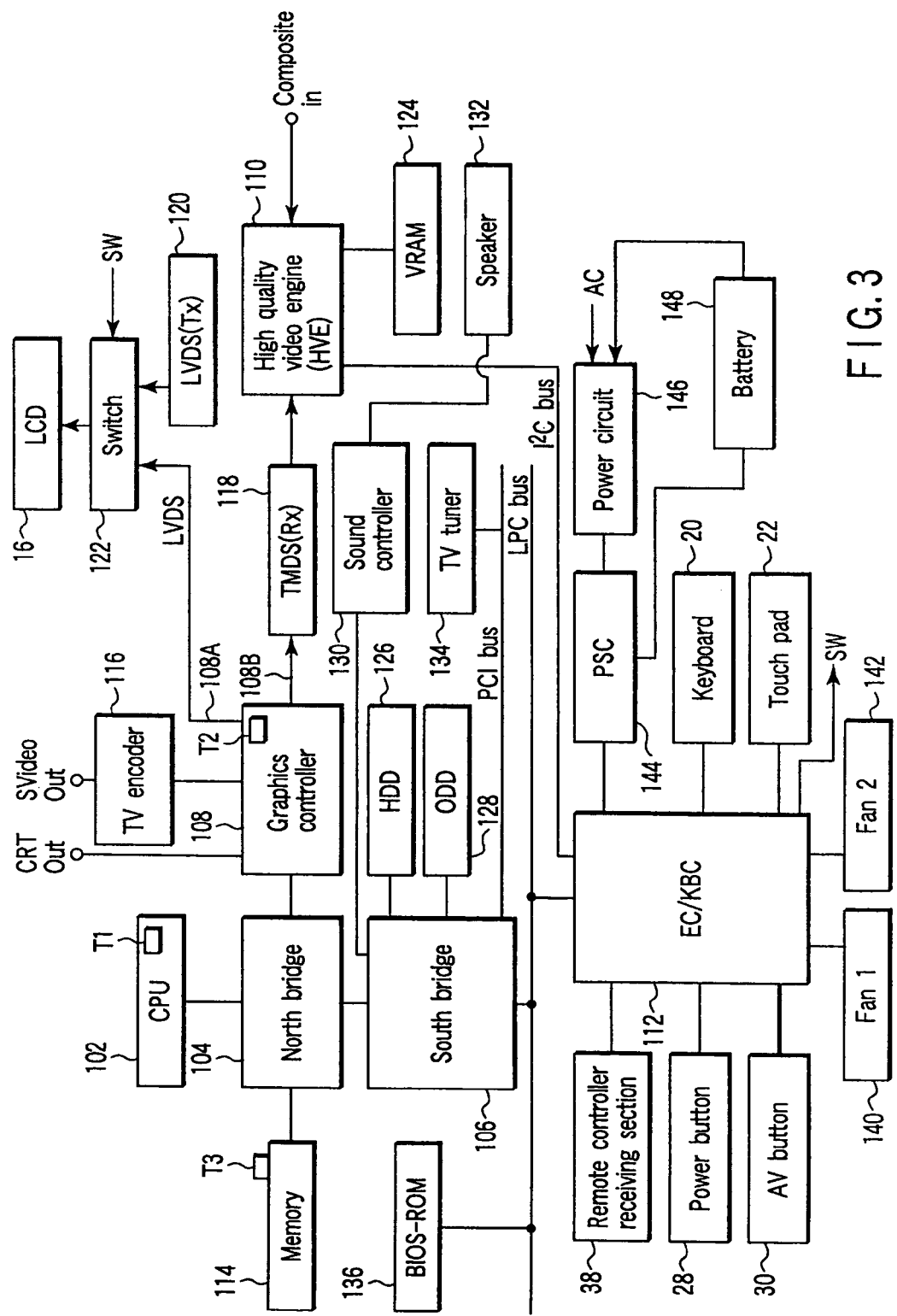
FIG. 3 is an exemplary block diagram showing a circuit configuration according to the embodiment.

When the AV viewing application is activated, a DVD/CD indicator (not shown) provided at bezel of an ODD 128 of FIG. 3 is lit, and audio buttons such as the backward button 30*e* and the forward button 30*f* become enabled. Although the AV viewing application is activated, even if the CD/DVD button 30*b* is pressed during a standby mode, nothing changes.

When the TV button 30*a* or CD/DVD button 30*b* is pressed during a power-off state, an AV specific operating system, which is OS software other than the OS WINDOWS® software, is booted up. An example of the AV specific operating system (OS) includes for example, LINUX® in this embodiment. Then, the TV viewing application or AV viewing application on the AV specific OS is launched in accordance with the pressed button.

The play/pause button 30*c* is the button that is pressed to start or interrupt reproduction by the AV viewing application irrespective of the WINDOWS® or LINUX® based OS, in which the application is launched. The stop button 30*d* has a function of stopping playback.

The backward button 30*e* has a function of return to a backward track, chapter, or item of data. The forward button 30*f* has a function of forwarding to a previous track, chapter, or item of data.

The record button 30*g* has a function of recording a TV program in a DVD or the like mounted to a hard disk drive (also referred as "HDD") 126 or an optical disk drive (also referred as "ODD") 128.

When the luminance button 30*h* is pressed, a screen for adjusting the luminance of the LCD panel 16 is displayed.

When the monitor input button 30*i* is pressed while an AV viewing application is activated, the button is toggled between the AV viewing application and an AV input.

When the TV output button 30*j* is pressed while the WINDOWS® OS is operated, the display of the LCD panel 16 is changed to a TV output. However, if the button 30*j* is pressed while the AV viewing application is operational, irrespective of the OS being either WINDOWS® or LINUX®, no display changes are necessary. The button 30*j* is programmable under the WINDOWS® OS, and is a utility that a user may set an option.

FIG. 3 shows a system configuration of the personal computer 1. The personal computer 1 mainly comprises a CPU 102, a north bridge 104, a south bridge 106, a graphics controller 108, a high quality video engine (also referred as "HVE") 110, an embedded controller/keyboard controller (also referred as "EC/KBC") 112, the main memory 114, and the like.

The CPU 102 is a processor provided to control an operation of the computer, and executes an operating system (OS), for example, a WINDOWS® OS and a variety of applications which are loaded from the HDD 126 to the main memory 114.

The north bridge 104 is a bridge device which couples a local bus of the CPU 102 to the south bridge 106. The north bridge 104 also incorporates a memory controller which accesses and controls the main memory 114. In addition, the north bridge 104 has a function of executing communication with the graphics controller 108 via an accelerated graphics port (also referred as "AGP") bus or the like.

The CPU 102 also executes a system BIOS which is an abbreviation of Basic Input Output System. The BIOS is stored in a BIOS-ROM 136. The system BIOS is a program for making hardware control.

Video data is moving picture data, and is, for example, TV broadcast program data received by the TV tuner 134, and video contents stored in storage media such as a DVD. The video data is generally displayed in a window which corresponds to a video reproduction application program for reproducing the video data. In this case, for example, a window corresponding to the video reproduction application program is disposed on a so-called desktop screen, and the video data is displayed in that window in a window mode.

In addition, the personal computer 1 may display video data in a full screen mode on the display screen of the LCD panel 16. In the full screen mode, only the video data is displayed in a substantially full area on the display screen. In this case, the desktop screen and a window corresponding to an application program other than the video reproduction application program are not displayed at all.

Further, a menu bar or the like of the window corresponding to the video reproduction application program is not displayed, and only the video data is displayed on a substantially full area on the display screen.

The graphics controller 108 is a display controller which controls the LCD panel 16 used as a display monitor of the personal computer 1. The graphics controller 108 has a video memory (also referred as "VRAM"), and generates a picture signal which forms a display image to be displayed on the LCD panel 16 from the display data depicted on the video memory by means of an OS/application program. In general, the display image to be displayed on the LCD panel 16 includes an image of a desktop screen and an image of each of the windows disposed on the desktop screen. However, in the case where video data is displayed in the full screen mode, the display image to be displayed on the LCD panel 16 comprises only the image of the video data. Therefore, in the case where the video data is displayed in the full screen mode, an image signal which forms only a display image of the video data is output from the graphics controller 108.

The image signal generated by the graphics controller 108 is output to each of a line 108A and a line 108B. The image signal output to the line 108A is composed of an 18-bit signal in accordance with a low voltage differential signaling (also referred as "LVDS") format, for example. The image signal output to the line 108B is composed of a 24-bit signal in a transition minimized differential signaling (also referred as "TMDS") format, for example. The graphics controller 108 is also coupled to: a terminal "CRT out" for outputting an analog image signal to an external cathode ray tube (also referred as "CRT") and an S-video terminal "SVideo out" for externally outputting an analog image signal processed by the TV encoder 116.

A TMDS (Rx) processing section 118 converts the 24-bit signal in accordance with the TMDS format, the signal being sent from the graphics controller 108 via the line 108B, to a 24-bit RGB digital signal, and sends the 24-bit RGB digital signal to the HVE 110.

The HVE 110 is an image processing controller which executes image processing for enhancing the picture signal generated by the graphics controller 108. This process is, hereinafter, referred to as an image quality correction process. The HVE 110 is coupled to a video memory (also referred as "VRAM") 124. The image quality correction process is executed on the VRAM 124. The image quality correction process is image processing exclusively used for a moving image for enhancing a moving image, and is executed to display a smooth and high quality mobile image on the LCD panel 16. In the image quality correction process, for example, processing operations such as color correction, sharpness adjustment, edge enhancement, and response speed improvement are performed in order to improve an image quality of a moving image. The color correction includes gamma correction, white balance adjustment, brightness adjustment, and contrast adjustment.

The HVE 110 may apply the image correction process to an image signal input from an external video device via a composite input terminal as well.

The image signal whose image quality is corrected by the HVE 110 is sent to the LVDS (Tx) processing section 120. The LVDS (Tx) processing section 120 converts the RGB digital signal whose image quality is corrected, the digital signal being output from the HVE 110 to a signal in accordance with the LVDS format, and outputs the signal in accordance with the LVDS format to a switch 122. In the case where an external LCD panel is used, a connection terminal is connected to an output of the LVDS (Tx) processing section 120.

The switch 122 functions as a selector which selectively outputs to the LCD panel 16 one of the image signal generated by the graphics controller 108 and the image signal whose image quality is corrected by the HVE 110. The switch 122 has: a first input terminal connected to the graphics controller 108; a second input terminal connected to the LVDS (Tx) processing section 120; and an output terminal connected to the LCD panel 16. The switch 122 is configured to select one of the first input terminal and the second input terminal according to a switch control signal SW supplied from the EC/KBC 112, and to connect the selected input terminal to the output terminal. By working of the switch 122, the following two display control modes may be employed in this embodiment.

(1) Normal mode: In a normal mode, the image signal from the graphics controller 108 is sent out to the LCD panel 16 without passing through the HVE 110. The normal mode is used in the case where a still image is included in the display image displayed on the LCD panel 16.

(2) High image quality mode: In a high image quality mode, the image signal from the graphics controller 108 is sent out to the LCD panel 16 via the HVE 110. The high image quality mode is used in the case where the still image is not included in the display image displayed on the LCD panel 16, namely, in the case where video data is displayed in a full screen mode.

However, a specific example of switching of the switch 122 described above is merely provided as one example, and the high image quality mode may be always set regardless of a moving image or a still image.

The south bridge 106 controls each device on a low pin count (also referred as "LPC") bus. In addition, the south bridge 106 incorporates an integrated drive electronics (also referred as "IDE") controller for controlling the HDD 126 and the ODD 128.

Further, the south bridge 106 has a function of controlling the TV tuner 134, a function for accessing and controlling the BIOS-ROM 136, and a function of driving the speaker 132 via the sound controller 130.

The ODD 128 is a drive unit for driving storage media such as a DVD and a CD having video contents stored therein. The TV tuner 134 is a receiver device for receiving broadcast program data such as a TV broadcast program. In the present embodiment, the TV tuner 134 also includes an MPEG-2 encoder.

The EC/KBC 112 is a one-chip microcomputer in which an embedded controller for power management and a keyboard controller for the keyboard (also referred as "KB") 20 and the touch pad 22 are integrated with each other. The EC/KBC 112 has: a function for turning on/off the power of the computer 1 according to a user's operation of the power button 28; a function of activating and controlling a variety of AV functions according to a user's operation of the AV button 30; a function for driving and controlling first and second fans 140, 142 serving as a cooling unit; and a function of controlling a power circuit 146 to which an AC power is supplied and a power supply controller (also referred as "PSC") 144 to which a battery 148 is connected.

Further, the EC/KBC 112 has a function of making communications with the HVE 110 via an $I^2C$ bus; and a function of supplying the above-described switch control signal SW to the switch 122.

A cooling capability which is the number of rotations of the cooling fans 140 and/or 142 is varied depending on an operating load, the temperatures of the CPU 102, the graphic controller 108, the TV tuner 134, the memory 114 and the like. The temperature of the CPU 102 is measured by a thermistor T1 mounted inside the CPU 102. The temperature of the graphic controller 108 is measured by a thermistor T2 mounted inside the graphic controller 108. As for the temperature of the TV tuner 134 and the memory 114, a thermister T3 mounted near those devices measures in this embodiment. The measured temperature by these thermisters T1, T2, and T3 is notified to the CPU 102.

Figure 4:
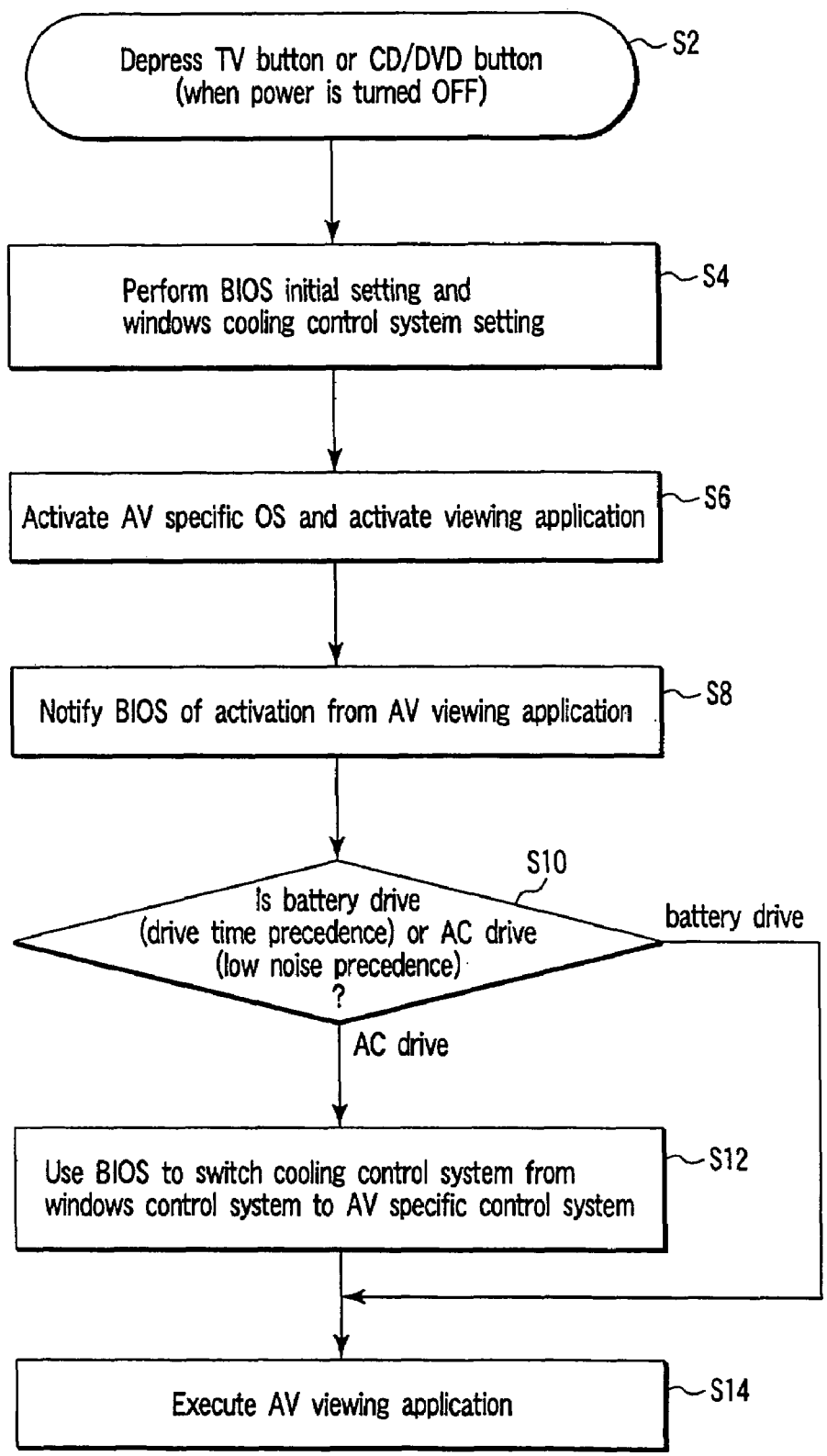
FIG. 4 is an exemplary flow chart showing a switching control of a cooling control system according to the embodiment.

A cooling operation according to this embodiment will be described with referring to FIG. 4. In the embodiment, the following functions are supported as functions of activating an AV specific OS, which is LINUX® in this embodiment, to perform AV viewing.

1) TV viewing
2) TV video recording
3) DVD viewing
4) CD appreciation

Unlike a multi-task process under the WINDOWS® environment, these functions operate independently under the AV specific OS environment, and thus, a maximum load may be limited. By limiting the maximum load, the number of rotations of a fan for cooling may be changed from a variable number of rotations according to a load to a fixed number of rotations, and the amount of noise caused by rotations of the fan may be reduced. In addition, since a load on these functions is smaller than that during multi-task processing under the WINDOWS® environment, the number of rotations may be limited or may be reduced in order to limit or reduce the amount of noise present. Thus, a cooling control method under the WINDOWS® OS environment and a cooling control method under the AV specific OS environment are switched, thereby making it possible to achieve low noise during AV viewing under the AV specific OS environment.

Since the BIOS controls the number of rotations of the fans 140 and 142, and the EC/KBC 112 drives the fans 140 and 142, it is necessary to discriminate whether or not an operating system currently activated by the BIOS is a normal OS (e.g., WINDOWS® OS), or the AV specific OS (e.g., LINUX® OS for this embodiment).

Thus, when the AV specific OS is activated, the operating system sets a flag. Therefore, it is possible to determine that the normal OS is activated if this flag is not set, and to determine that the AV specific OS is activated if the flag is set. The flag is stored in the main memory 114 or the like.

If the TV button 30a or the CD/DVD button 30b is pressed when power is turned off (block S2), the BIOS is activated and initially set (block S4). At the time of initial setting, the WINDOWS® cooling control method is set as a cooling control method. Under the WINDOWS® cooling control method, the number of rotations of the fan is varied depending on a temperature of each section measured by the thermisters T1, T2, and T3.

In block S6, the AV specific OS is activated, and the AV viewing application having a function which corresponds to a pressed button, the application operating under this OS, is activated. The AV application enables TV viewing, TV image recording, DVD viewing, and CD appreciation. When the TV button 30a is pressed, TV viewing and TV image recording may be performed. When the CD/DVD button 30b is pressed, DVD viewing and CD appreciation may be performed.

When activation is notified from the AV viewing application to the AV specific OS, the AV specific OS sets a flag in the memory 114. The BIOS may recognize activation of the AV specific OS on the basis of a value of this flag (block S8).

Although a battery drive as well as a commercially available power drive, which is AC drive, is possible in this embodiment, a noise reduction process according to the embodiment makes the number of rotations uniform, and thus, there may be some case that a little more power is consumed. For this reason, the noise reduction process according to the embodiment is performed only in the case of the AC drive, and no noise reduction process is performed in the case of the battery drive. Thus, in block S10, the AC drive which is noise reduction priority mode or the battery drive which is drive time priority mode is determined. In the case of the AC drive, the BIOS sets the cooling control method for the AV specific OS as a cooling control method in block S12. Under the cooling control method for the AV specific OS, the number of rotations of the fan is fixed to a predetermined number of rotations according to an application regardless of the temperature of each section. An exemplary number of rotations are shown in FIG. 5. At the time of TV viewing, only the TV tuner 134 operates as a main heat generation source; at the time of TV video recording, the TV tuner 134 and the HDD 126 operate; and at the time of DVD viewing and CD appreciation, the ODD 128 operates, so that a predetermined number of rotations according to the heat generation source is obtained. At the time of the TV video recording which is the greatest in load and which is large in heat rate, the BIOS sets to 4,500 rotations for the first fan 140, and sets to 3,500 rotations for the second fan 142. The EC/KBC 112 drives the fans 140 and 142 in accordance with the set rotations.

At the time of the TV viewing, the BIOS sets to 4,000 rotations for the first fan 140, and sets to 3,000 rotations for the second fan 142, as well. At the time of the DVD viewing, the BIOS sets only the first fan 140 to 3,500 rotations. The second fan 142 is not rotated and is stopped. At the time of the CD appreciation, the BIOS sets only the first fan 140 to 3,000 rotations. The EC/KBC 112 drives the fans 140 and 142 in accordance with the set rotations.

Then, the AV viewing application is executed (block S14).

In the case where the battery drive is determined in block S10, block S12 is skipped, and block S14 is executed immediately.

As described above, according to this embodiment, the number of rotations of the fan is varied depending on a load in the case where a normal OS is executed, and a multi-task process is performed as a general personal computer. In addition, in the case where the application limited by activating the AV specific OS is executed in a single task without activating the normal OS, the fan is rotated by a predetermined number of rotations according to the application, whereby cooling fan noise reduction may be achieved at the time of AV viewing.

The present invention may be implemented by variously modifying it without being limited to the above-described embodiment. For example, although the fan is rotated by a predetermined number of rotations according to the application while the AV specific OS operation mode is limited to the AC drive mode in the foregoing description, a predetermined number of rotations according to the application may be set in the case where an attempt is made to set priority over low noise during the battery drive as well. Alternatively, at the time of the AV specific OS operation, a merely low speed and predetermined number of rotations may be set regardless of the application. A predetermined number of rotations is set at the time of the AV specific OS operation. However, if the number of rotations changes infrequently, noise reduction may be accelerated. Thus, when a variable number of fan rotation frequencies at the time of normal OS operation is set to, for example, four (4), the number of rotations of the fan is varied depending on a load regardless of the battery drive mode when the AV specific OS operation mode is the AC drive mode, but its variable number may be reduced, for example, may be set to two (2). In addition, when the load increases, a CPU clock frequency may be lowered instead of increasing the number of rotations of the fan or in addition to such an increase. Further, although a predetermined number of rotations has been set according to the application at the time of the AV specific OS operation, it may be varied to two (2) according to the load.

The present invention is not limited to the above-described embodiment as is, but may be instantiated by modifying constituent elements with departing from the spirit of the invention at the stage of implementation. In addition, a variety of inventions may be formed by a proper combination of a plurality of constituent elements disclosed in the above-described embodiment. For example, some of all the constituent elements presented in the embodiments may be erased. Further, the constituent elements across the different embodiments may be properly combined with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus, comprising:
   a memory to store a first operating system used in a first mode and a second operating system used in a second mode specific to at least audio reproduction, the first operating system having more function than the second operating system;
   a processor to execute the first operating system and the second operating system;
   a cooling unit; and
   a driving unit to drive the cooling unit in accordance with the operating load in the first mode, and to drive the cooling unit in a predetermined level regardless of the operating load in the second mode.

2. An information processing apparatus according to claim 1, wherein the processor executes an application program in the second mode, and the driving unit drives the cooling unit in a certain level corresponding to the application program being executed.

3. An information processing apparatus according to claim 1, wherein the cooling unit includes a fan, and the driving unit drives the fan by the number of rotations in accordance with the operating load in the first mode, and drives the fan by a predetermined number of rotations in the second mode.

4. An information processing apparatus according to claim 1, further comprising a power switch and a dedicated button, wherein the first operating system is activated by turning on the power switch, and the second operating system is activated when the dedicated button is operated while powered off.

5. An information processing apparatus according to claim 1, wherein the second operating system sets a flag when the second operating system is activated.

6. An information processing apparatus according to claim 5, further comprising a second memory to store a BIOS which controls the drive unit, wherein the BIOS switches driving condition of the driving unit on the basis of the flag.

7. An information processing apparatus according to claim 1, further comprising a controller to determine that or not the power is supplied by battery, wherein when the battery supplies power, the drive unit drives the cooling unit in accordance with the operating load even in the second mode.

8. An information processing apparatus according to claim 7, wherein the drive unit drives the cooling unit in any of plural first levels in accordance with the operating load in the first mode, and drives the cooling unit in any of plural second levels which are fewer than the plural first levels, in accordance with the operating load in the second mode.

9. An information processing apparatus according to claim 1, further comprising a setting unit to set a drive time priority mode, wherein when the drive time priority mode is set, the drive unit drives the cooling unit in accordance with the operating load even in the second mode.

10. An information processing apparatus according to claim 9, wherein when the drive time priority mode is set, the drive unit drives the cooling unit in any of plural first levels in accordance with the operating load in the first mode, and drives the cooling unit in any of plural second levels which are fewer than the plural first levels, in accordance with the operating load in the second mode.

11. An information processing apparatus, comprising:
a memory to store an operating system used in a first mode and an application program used in a second mode specific to at least audio reproduction without the operating system;
a processor to execute the first operating system and the application program;
a cooling unit; and
a driving unit to drive the cooling unit in accordance with the operating load in the first mode, and to drive the cooling unit in a predetermined level regardless of the operating load in the second mode.

12. An information processing apparatus according to claim 11, wherein the cooling unit includes a fan, and the driving unit drives the fan by the number of rotations in accordance with the operating load in the first mode, and drives the fan by a predetermined number of rotations in the second mode.

13. A cooling method of an information processing apparatus operated by a first operating system in a first mode and operated by a second operating system in a second mode specific to at least audio reproduction, comprising:
cooling the apparatus in accordance with operating load in the first mode; and
cooling the apparatus regardless of the operating load in the second mode.

14. A cooling method according to claim 13, further comprising, when an application program is executed in the second mode, cooling the apparatus in a certain level corresponding to the application program being executed.

15. A cooling method according to claim 13, further comprising setting a flag in the second mode.

16. A cooling method according to claim 15, further comprising switching the cooling conditions by a BIOS on the basis of the flag.

17. A cooling method according to claim 13, further comprising determining whether or not the power is supplied by battery, wherein when the battery supplies power, cooling the apparatus in accordance with the operating load even in the second mode.

18. A cooling method according to claim 17, wherein cooling in any of plural first levels in accordance with the operating load in the first mode, and cooling in any of plural second levels which art fewer than the plural first levels, in accordance with the operating load in the second mode.

19. A cooling method according to claim 13, further comprising setting a drive time priority mode, wherein when the drive time priority mode is set, cooling the apparatus in accordance with the operating load even in the second mode.

20. A cooling method according to claim 19, wherein when the drive time priority mode is set, cooling the apparatus in any of plural first levels in accordance with the operating load in the first mode, and cooling the apparatus in any of plural second levels which are fewer than the plural first levels, in accordance with the operating load in the second mode.

* * * * *